(12) United States Patent
Darcy

(10) Patent No.: US 8,972,366 B2
(45) Date of Patent: Mar. 3, 2015

(54) CLOUD-BASED DIRECTORY SYSTEM BASED ON HASHED VALUES OF PARENT AND CHILD STORAGE LOCATIONS

(75) Inventor: Jeffrey Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 450 days.

(21) Appl. No.: 12/893,612

(22) Filed: Sep. 29, 2010

(65) Prior Publication Data
US 2012/0078915 A1 Mar. 29, 2012

(51) Int. Cl.
*G06F 17/30* (2006.01)
*G06F 12/00* (2006.01)

(52) U.S. Cl.
CPC .............................. *G06F 17/30097* (2013.01)
USPC .................. 707/698; 707/E17.052; 707/828; 711/216

(58) Field of Classification Search
USPC .......................................... 707/698, E17.052
See application file for complete search history.

(56) References Cited

U.S. PATENT DOCUMENTS

2013/0013619 A1* 1/2013 Lacapra et al. ............... 707/747

OTHER PUBLICATIONS

Programmer's Toolbox Part 3: Consistent Hashing, Mar. 17, 2008, pp. 1-12.*
Karger, Web Caching with Consistent Hashing, 1999, Elsevier Science B.V., pp. 125-135.*
Andersen, FAWN: A Fast Array of Wimpy Nodes, May 2008, pp. 1-21.*
Lim, Hashing Directory Scheme for NAND Flash File System, 2007, pp. 273-276.*
James Michael Ferris, "Systems and Methods for Generating Optimized Host Placement of Data Payload in Cloud-Based Storage Network", U.S. Appl. No. 13/118,075, filed May 27, 2011.
Jeffrey Darcy, "Systems and Methods for Searching a Cloud-Based Distribute Storage Resources Using a Set of Expandable Probes", U.S. Appl. No. 12/893,737, filed Sep. 29, 2010.
Jeffrey Darcy, "Systems and Methods for Monitoring Files in Cloud-Based Networks", U.S. Appl. No. 12/893,388, filed Sep. 29, 2010.
Jeffrey Darcy, "Systems and Methods for Dynamically Replicating Data Objects Within a Storage Network", U.S. Appl. No. 12/872,022, filed Aug. 31, 2010.
James Michael Ferris, "Systems and Methods for Stage Data Migration Between Data Sources and Cloud-Based Storage Network", U.S. Appl. No. 13/037,183, filed Feb. 28, 2011.
James Michael Ferris, "Systems and Methods for De-Populating Cloud Data Storage", U.S. Appl. No. 13/036,977, filed Feb. 28, 2011.

(Continued)

*Primary Examiner* — Albert Phillips, III
(74) *Attorney, Agent, or Firm* — Lowenstein Sandler LLP

(57) ABSTRACT

Embodiments relate to systems and methods for a cloud-based directory system based on hashed values of parent and child storage locations. Platforms and techniques are provided to store a data object to cloud storage resources in two or more locations recorded in a consistent hash structure. A file management tool can store one copy of the data object to a location corresponding to the hashed value of the file path or name, and a second copy to a location corresponding to the hashed value of the parent directory of the data object. All files sharing a common parent directory or other location therefore have at least one copy stored to the same location, in common with the parent. Directory-wide read, write, and/or search operations can therefore be performed more efficiently, since the constituent files of a directory or other location can be accessed from one location rather than distributed locations.

16 Claims, 9 Drawing Sheets

(56) References Cited

OTHER PUBLICATIONS

James Michael Ferris, "Systems and Methods for Migrating Data Among Cloud-Based Storage Networks Via a Data Distribution Service", U.S. Appl. No. 13/037,215, filed Feb. 28, 2011.

James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.

James Michael Ferris, "Systems and Methods for Establishing Upload Channels to a Cloud Data Distribution Service", U.S. Appl. No. 13/037,230, filed Feb. 28, 2011.

James Michael Ferris, "Methods and Systems to Automatically Extract and Transport Data Associated with Workload Migrations to Cloud Networks", U.S. Appl. No. 13/116,599, filed May 26, 2011.

James Michael Ferris, "Systems and Methods for Cloud Data Deployment Based on Preferential and/or Existing Subscription Relationships", U.S. Appl. No. 13/117,331, filed May 27, 2011.

James Michael Ferris, "Methods and Systems for Data Compliance Management Associated with Cloud Migration Events", U.S. Appl. No. 13/118,123, filed May 27, 2011.

James Michael Ferris, "Systems and Methods for Determining Consistencies, in Staged Replication Data to Improve Data Migration Efficiency in Cloud Based Networks", U.S. Appl. No. 13/117,235, filed May 27, 2011.

* cited by examiner

CLOUD-BASED DIRECTORY SYSTEM BASED ON HASHED VALUES OF PARENT AND CHILD STORAGE LOCATIONS

FIELD

The present teachings relate to systems and methods for a cloud-based directory system based on hashed values of parent and child storage locations, and more particularly to platforms and techniques for establishing storage nodes for a data object in both a first location in a hash structure based on the object's attributes, as well as a second location based on the parent directory or other location for the object.

BACKGROUND OF RELATED ART

Hash structures are used in computer systems to map identifying values, or keys, to their associated values or storage locations storing those values. A hash function is used to transform the key into the index of an array element where the associated value or pointer to that value is stored. When items in the hash structure are removed or deleted, the hash structure usually undergoes a rehash, whereby existing items in the hash structure are mapped to new locations. Hash structures can be used in cloud-based networks to arrange distributed storage schemes, in which mappings in the hash structure can contain or point to stored data objects, such as files that can be used by applications running in the cloud.

"Consistent hashing" can be implemented such that the addition or removal of one slot does not significantly change the mapping of keys to locations. In particular, consistent hashing involves associating a real angle to stored items to effectively map the item to, for example, a point on the circumference of a circle. In addition, available machines or servers are mapped to locations around the circle. The machine or server on which the item is to be stored is chosen by selecting the machine at the next highest angle along the circle after the item. If a storage location on the machine becomes unavailable, then the angles mapping to the location are removed and requests for files or other data objects that would have mapped to the unavailable location are now mapped to the next available storage location.

In a large-scale cloud-based networks or other distributed networks, various choices are available to the systems designer in terms of storage architecture, including where to place data objects, the directory or other logical storage structure for those objects, the format to be used for those objects, and the number of copies or other replication policy to use for those objects. One possible choice for storage implementation is to copy or "stripe" copies of all data objects to all possible servers or other storage resources, or to a substantial portion of them. Wide-scale striping however can incur performance and reliability penalties, including when a significant number of users are attempting to access those files or other data objects at the same or different times. At the other end of the architectural spectrum, a systems designer could also choose to place data objects into just one location for each object. This choice, while eliminating processing overhead needed to seek and extract a given data object, however, also eliminates helpful data redundancy and can lead to contention between users requesting the file or other object.

In the case of cloud-based networks, it may at times therefore be desirable to store more than one copy of a data object in the data storage resources of the cloud, but at the same time avoid implementing wide-scale striping to the cloud. It may be useful to maintain a relatively small or discrete number of copies of a given data object for more than one reason—data redundancy or backup in the face of possible storage failures being one. In addition, in a cloud-based network, more than one user or application may wish to access the same file or other data object at the same or different times, and serving files to requesting users may incur fewer bottlenecks when a discrete or intermediate number of sources of the data object is available.

When implementing a storage scenario where a file or other data object is stored on a comparatively small scale, for example, two to five copies of the file or other object, it would be possible to establish and encode that comparatively smaller set of copies of the file using a hash structure. In some cases, the hash structure nodes storing those objects or links to their locations can be spread around the hash structure, for instance based on attributes of the data objects and/or randomized offsets to separate different copies. When data objects are hashed and stored in this manner, each individual data object can be distributed randomly or variously across the hash structure and/or underlying storage resources. This may contribute to better data redundancy, among other things.

However, in cases two data objects, such as files, can bear a relationship to each other which is lost in the distribution of those objects to scattered hash locations. For instance, files which are contained in or descend from the same parent directory in a directory file structure can be encoded and stored in nodes or locations entirely separate from those for the parent directory itself. When a user wishes to perform various common file processing tasks such as, for instance, to read all files within a (common) parent directory, write to those files, or search those files, the hash management logic or platform is forced to locate and extract those files from an entire series of unrelated locations or sources. Those sources can be or include separate or remote storage servers or databases, each of which has to be looked up, navigated to and accessed to scan the files in the parent directory. This can impose significant performance penalties for these common file operations.

It may therefore be desirable to provide systems and methods for a cloud-based directory system based on hashed values of parent and child storage locations, in which files or other data objects are each stored in a normally-hashed location, as well as consistently inserted and stored to the hash node of their parent directory or other location to establish common visibility to read, write, and other operations.

DESCRIPTION OF EMBODIMENTS

Figure 1:
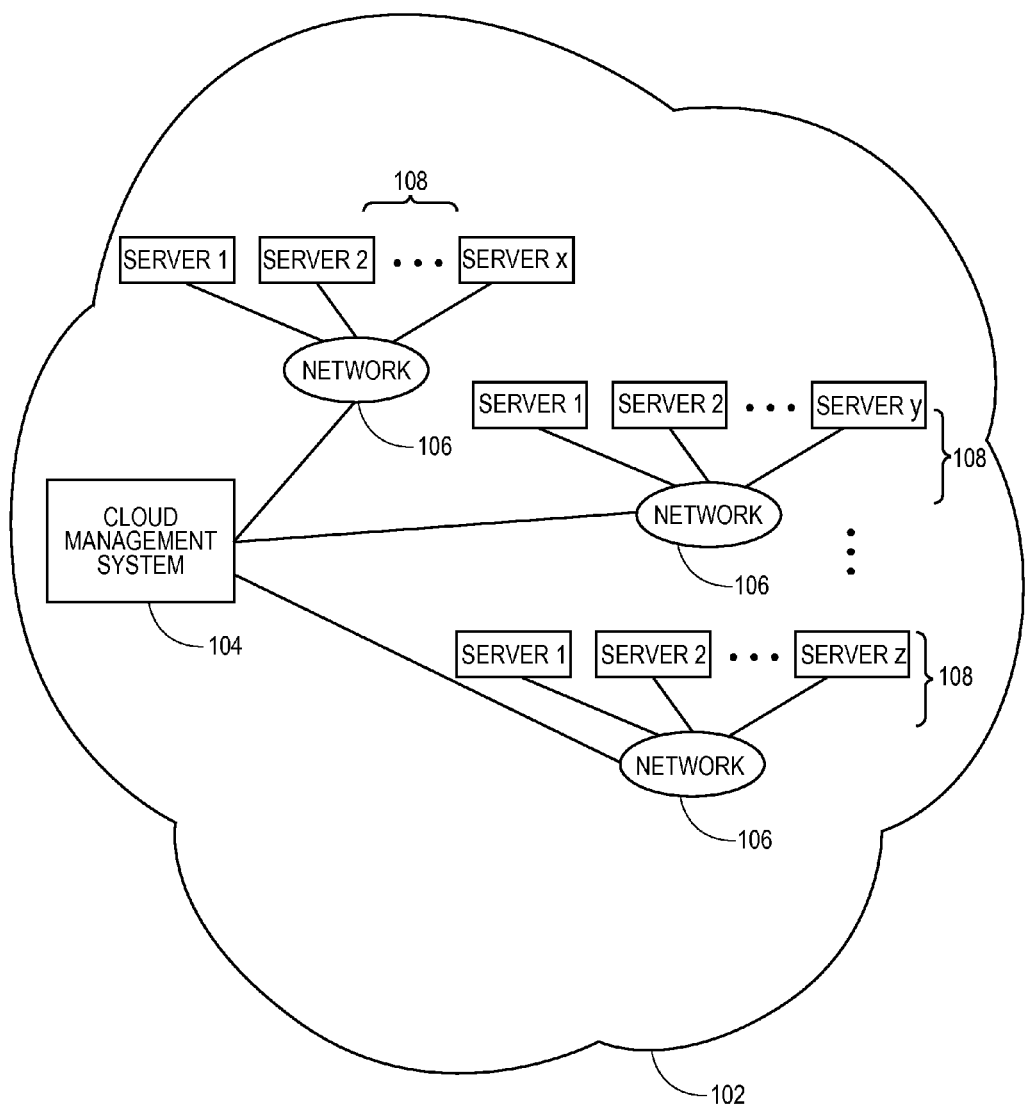
FIG. 1 illustrates an overall cloud system architecture in which various embodiments of the present teachings can be practiced.

Embodiments of the present teachings relate to systems and methods for a cloud-based directory system based on hashed values of parent and child storage locations. In particular, embodiments relate to platforms and techniques for generating and conducting search operations to locate missing files stored in a cloud-based distributed storage architecture, in which the locations of files (or files themselves) are stored in the nodes of a consistent hash structure such as a hash ring. According to various regards of the present teachings, a file management tool can be configured to encode and store files and other data objects in a relatively small or discrete number of nodes in the hash structure, but preserve at least one copy of the object in the parent location of that object to permit visibility for that object from the parent node, and thereby host a copy of all objects with a common parent in a common storage location. In aspects, the link structure stored in the hash structure entry for the parent directory node will therefore identify all other nodes holding copies/portions of the file/object. Read, write, search, and/or other operations on files or other data objects in a common directory can therefore be performed more efficiently.

According to aspects in general regards, the hash structure in combination with the cloud-based network can allow for a distributed system of file storage and retrieval by one or more users of the cloud and/or applications in the cloud. For example, an operator of the cloud-based network can insert files into available storage devices of the cloud, such as storage servers, RAID (redundant array of inexpensive disks) arrays, data warehouses and/or other storage resources on a dynamic and/or distributed basis while using the hash structure to maintain locations of the files. In embodiments, users or computer hardware or software can request access to the file.

In embodiments, specifically a memory address of the file can be allocated to a storage server or other storage device that is correspondingly mapped to the hash structure. In aspects, the users can be a set of end users accessing, via a set of instantiated virtual machines in a cloud-based network, files associated with application, service, and/or other resources provided by one or more vendors, such as independent service vendors (ISVs) or others.

Embodiments described herein can be implemented in or supported by a cloud network architecture, in which files and/or other data objects requested by one or more users can be stored to various distributed storage resources of the cloud. As used herein, a "user" can refer a person, customer, subscriber, administrator, corporation, organization, or other entity accessing files and/or devices storing the files in the cloud-based network. In embodiments, the user can operate or manage computer software, hardware, services, and/or other resources that can access files and/or devices storing the files in the cloud-based network. Further, as used herein, a "cloud" can in regards comprise a collection of resources that can be invoked to instantiate a virtual machine, process, or other resource for a limited or defined duration, as described herein.

As used herein, the "storage devices" can be hardware such as, for example, servers, device drivers, storage such as hard drives, virtual memory, databases, RAID arrays, hard disks, optical discs such as CD-ROM, DVD-ROM and Blu-ray discs, random access memory (RAM) and other memory, processors, multimedia cards, magnetic tape, and/or other storage media or resources hosted in the cloud-based network. The storage devices can be accessed by users or by software or applications independent from or associated with resources of the cloud-based network. Resources in the cloud-based network can include any hardware, software, and/or communications resources, such as ports or channels provided to a virtual machine or other machine or process in the cloud. Resources can likewise include services, such as Web-based services deployed in the cloud, for example security or identity management services and/or other resources.

As used herein, a "hash structure" can be any data structure, model, object, and/or encoding that uses a hash function to map keys or other inputs to corresponding nodes on that structure, which nodes can either contain the desired data object itself and/or a link or other pointer to the desired data object. In embodiments, the output of the hashing process can comprise an angular value produced by hashing the name of a file that points to a location around a ring, with the closest next node (e.g. in a clockwise direction) then storing an address, link, and/or other location of a file or other data object stored on an associated storage device hosted in the cloud. In embodiments, the closest next node pointed to by the hashed angular value can also or instead itself contain the file or other data object, in memory or other storage associated with the hash structure.

One or more hash structures used herein can be implemented as a consistent hashing scheme, whereby the address locations storing a desired file or other data object are mapped and allocated to mapped storage devices via a circular or ring-based hash structure. One or more users or entities can access the hash structures to overwrite, change, delete, update, reformat, or otherwise modify or manipulate keys or values associated with the hash structures, such as file names or file versions. It should be appreciated that various hash functions known to persons skilled in the art can be employed to map keys, such as requested file names, to the associated angular values or other pointers to hash nodes associated with stored files. In embodiments, the hash structures can be employed in one or more cloud-based networks.

FIG. 1 illustrates an overall cloud system architecture, in which various embodiments of the present teachings can be practiced or implemented. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
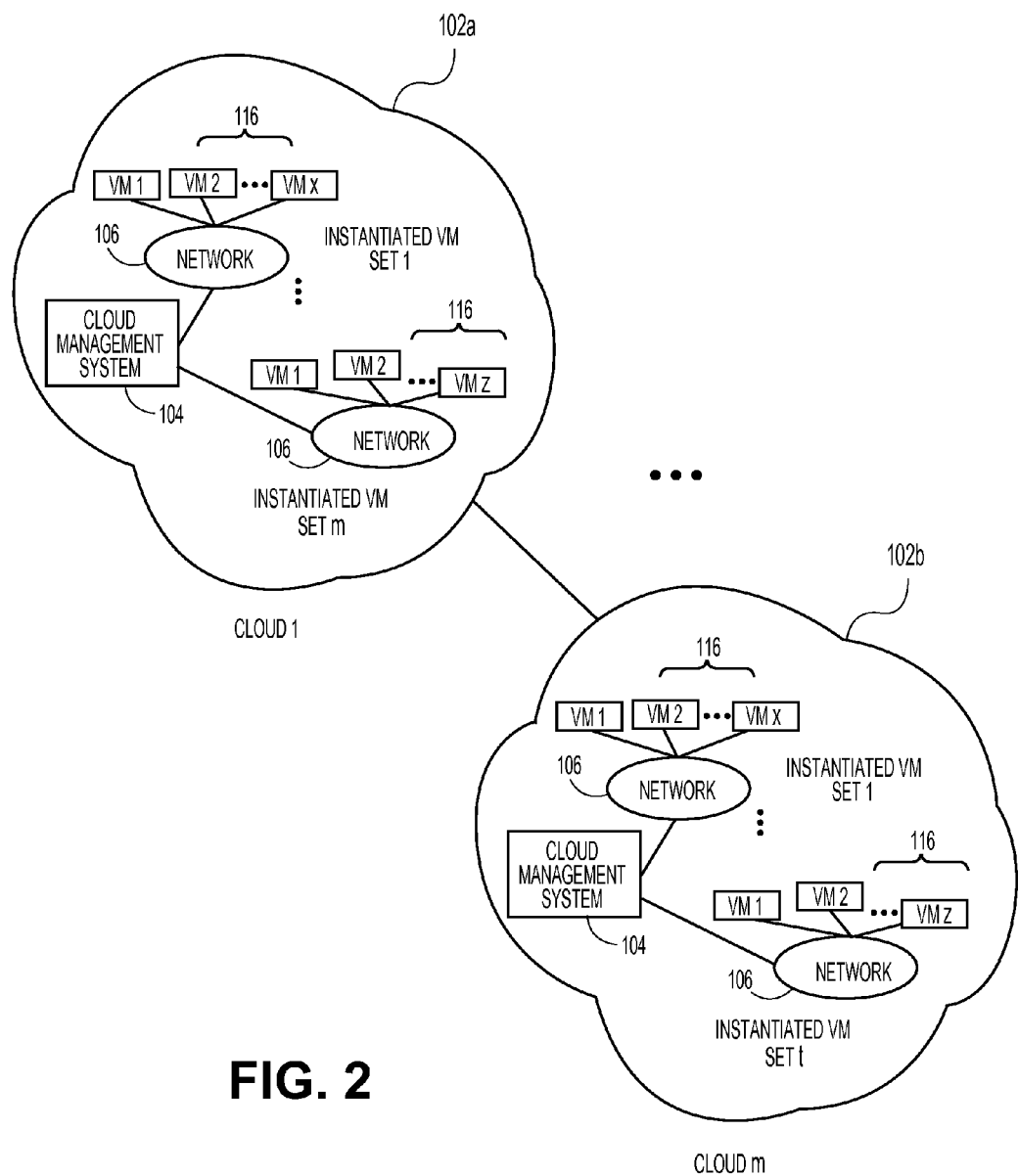
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102a, 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102a, 102b hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown, in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
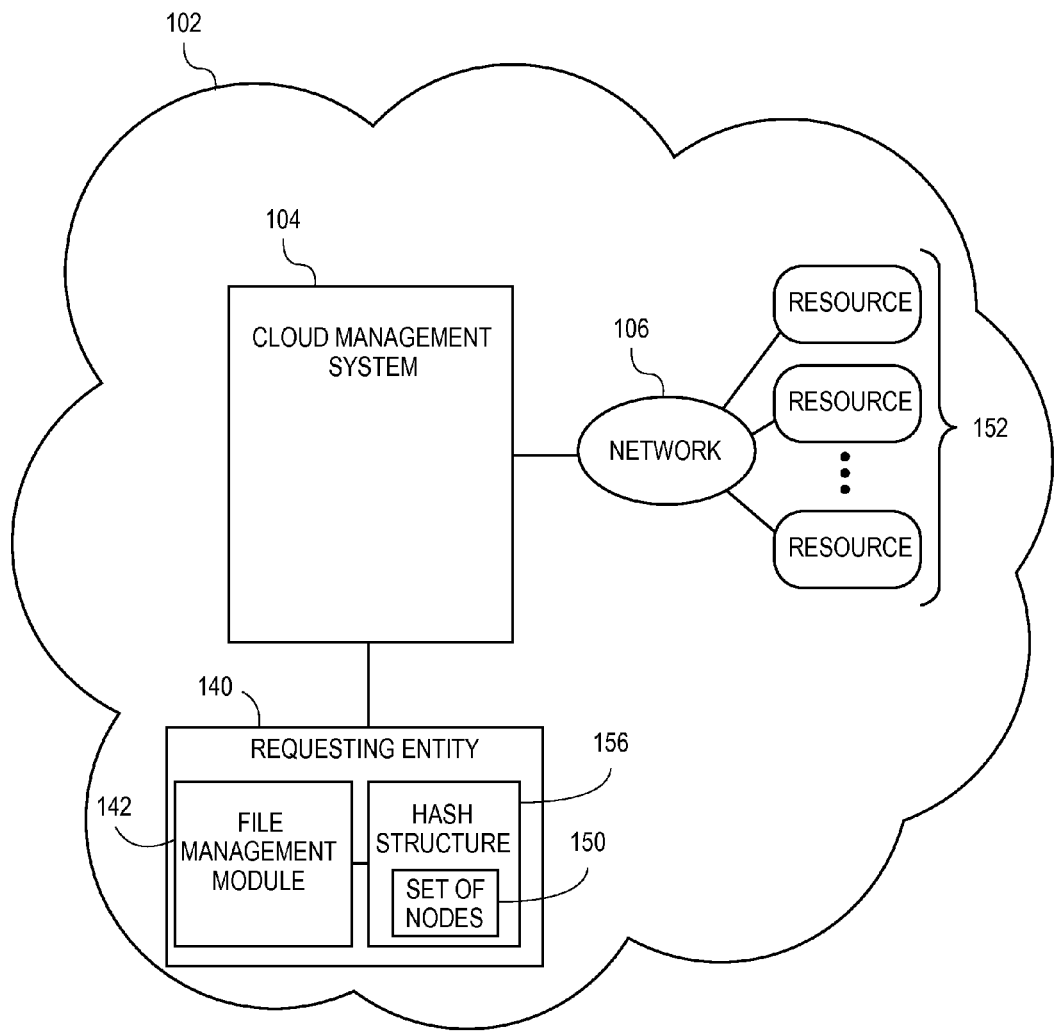
FIG. 3 illustrates an exemplary network configuration that can be used in systems and methods for a cloud-based directory system based on hashed values of parent and child storage locations, according to various embodiments.

FIG. 3 illustrates an exemplary network configuration that can be used in systems and methods for managing file modifications in cloud-based networks. In embodiments as shown, the cloud management system 104 can interface with a requesting entity 140, and with a set of storage resources 152 of the cloud 102 via the network 106. In aspects, the requesting entity can comprise a physical or virtual client machine operated by a user or users, such as a personal computer, cellular telephone, and/or other wired or wireless network-enabled device. The requesting entity 140 can request files and/or other data objects stored on the set of storage resources 152 of the cloud 102. In embodiments, the set of storage resources 152 can be servers, virtual machines, and/or other storage resources associated with the cloud 102.

In aspects, the requesting entity 140 can comprise a file management module 142 that can be configured to interface with a hash structure 156 that can map keys to their associated values. In embodiments, candidate storage locations of files stored on the set of storage resources 152 can be mapped to nodes stored on or associated with the hash structure 156. In embodiments, the hash structure 156 can be implemented using consistent hashing, such as a ring-based hash structure, although other hashing techniques and structures are envisioned. An operator of the cloud 102 can insert files into any available storage resource a dynamic and/or distributed basis while using the hash structure 156 to maintain locations of the files.

It should be appreciated that the hash structure 156 or a copy thereof can be implemented or stored on other resources of cloud 102 such as, for example, the cloud management system 104. It should further be appreciated that the file management module 142 can be implemented on other hardware and/or software components configured to interface with the other components and entities described herein. Further, it should be appreciated that the file management module 142 can be configured to interface with additional clouds (not shown in figures) and associated resources, such as virtual machines 116, of the additional clouds.

In embodiments, the requesting entity 140 can be a user, owner, administrator, company, software program or application, service, or other entity or resource who can submit a request to access or retrieve a file stored on the set of storage resources 152 of the cloud 102. For example, a user can submit a file request to access or retrieve a file stored on a virtual machine 116 in the cloud 102. In embodiments, the file management module 142 can determine, from the file request, a candidate storage address for the file that can be mapped to the hash structure 156 and allocated to a storage device 306 also mapped to the hash structure 156. The file management module 142 can be configured to communicate with the cloud management system 104, the set of storage resources 152, the hash structure 156, and/or other resources of the cloud 102.

According to embodiments, the file management module 142 can track and manage location histories of files via file links mapped on the hash structure 156. In embodiments, the file links can point to storage locations of the storage devices 306 on which the files are stored, such as, for example, a uniform resource locator (URL). Further, the storage devices 306 themselves can be mapped to the hash structure 156. In embodiments, hash structure, node storage and associated access techniques such as those described in co-pending U.S. application Ser. No. 12/893,388, entitled "SYSTEMS AND METHODS FOR MONITORING FILES IN CLOUD-BASED NETWORKS," filed on Sep. 29, 2010, issued as U.S. Pat. No. 8,660,996 on Feb. 25, 2014, and having the same inventor as this application and assigned or under obligation of assignment to the same entity as this application, which application is incorporated herein in its entirety by reference, can be used to manage and store files in the associated hash structure 156.

In operation, the file management module 142 can generally examine a file access request from the requesting entity 140 to determine node on the hash structure 156 to which that file and/or other data object is mapped. For example, the file management module 142 can use a hash algorithm to generate an angular value on the hash structure 156 as a function of a name of the file. The closest node, for instance in a clockwise (or counterclockwise or other) direction, to that angular value can store an associated value for a candidate storage location in which the desired file is stored. It should be appreciated that other key generation and value determination algorithms are envisioned. In the regular course of retrieval processing, the requested file and/or other data object can be expected to be found directly or indirectly (e.g. by following links) from the corresponding node.

In various embodiments using the hash structure 156 and related logic to implement a network storage arrangement, it may be desired to copy, mirror, stripe, and/or otherwise store or encode more than one copy of a file, database, code, and/or other data object in the set of storage resources 152. In aspects, the number of copies of each data object to be stored to the set of storage resources 152 can be at least two. In aspects, one copy of the data object can be encoded in the hash structure 156 at a node located or generated using the name and/or storage path for the object, in the regular fashion using the hash structure 156. In aspects, a second copy of the data object can be encoded in the hash structure 156 at a node located or generated using the name and/or path for a parent location of the data object, such as a directory name or path for a parent directory under which the data object is stored. The data object can also, if desired, be stored in additional locations.

Figure 4A:
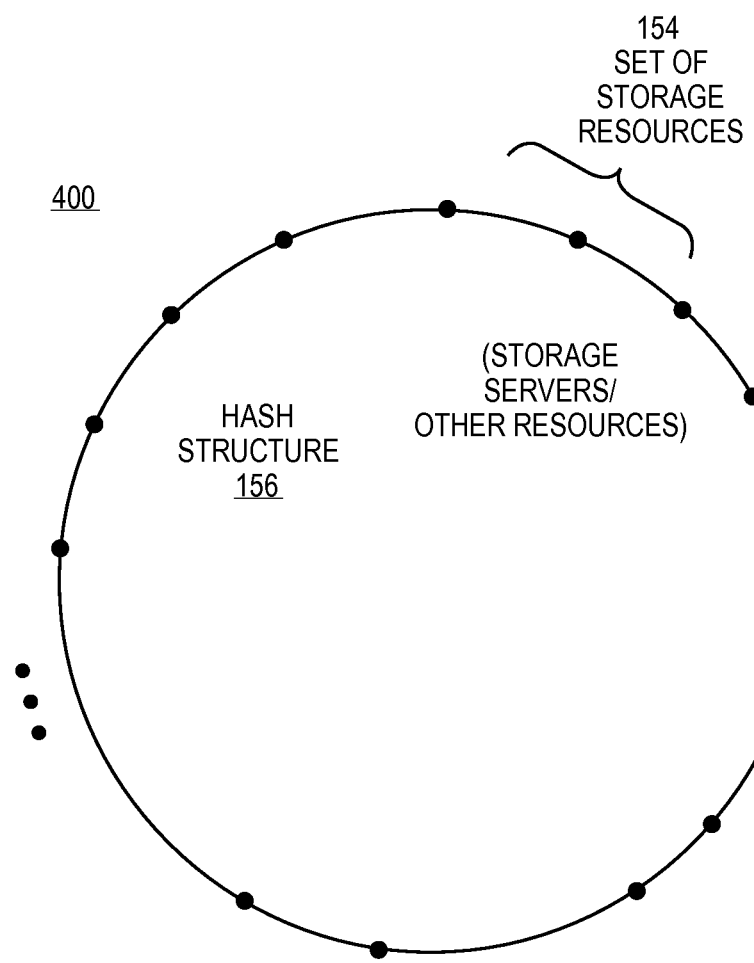
FIGS. 4A-4D illustrate a hash structure and illustrative operations to generate a set of child nodes having a common parent node encoded in a hash structure, according to various embodiments.

More particularly, and referring to FIG. 4A, depicted is a exemplary mathematical space 400 in which a hash structure 156 can be encoded or constructed to allocate and store files to storage resources using consistent hashing, and in which space 400 search operations according to embodiments can be conducted. As shown in FIG. 4A, the mathematical space 400 can be a circle with a radius of 1, however, it should be appreciated that the mathematical space 400 can comprise different spaces. The mathematical space 400 can comprise files and a plurality of servers or other storage resources in the set of storage resources 152 mapped to a set of nodes or points on the circle or ring using a consistent hash function. For example, as shown in FIG. 4A, each darkened node can correspond to one file server, database, RAID array, datacenter, and/or other storage resources of the cloud 102 and/or other networks. In general, when it is desired to store a new file or other data object to the set of storage resources 152 and record or encode the location of the data object once stored, the file management module 142 and/or other logic can select any available storage resource in which to store that object, and encode the location in a node of the hash structure 156.

Figure 4B:
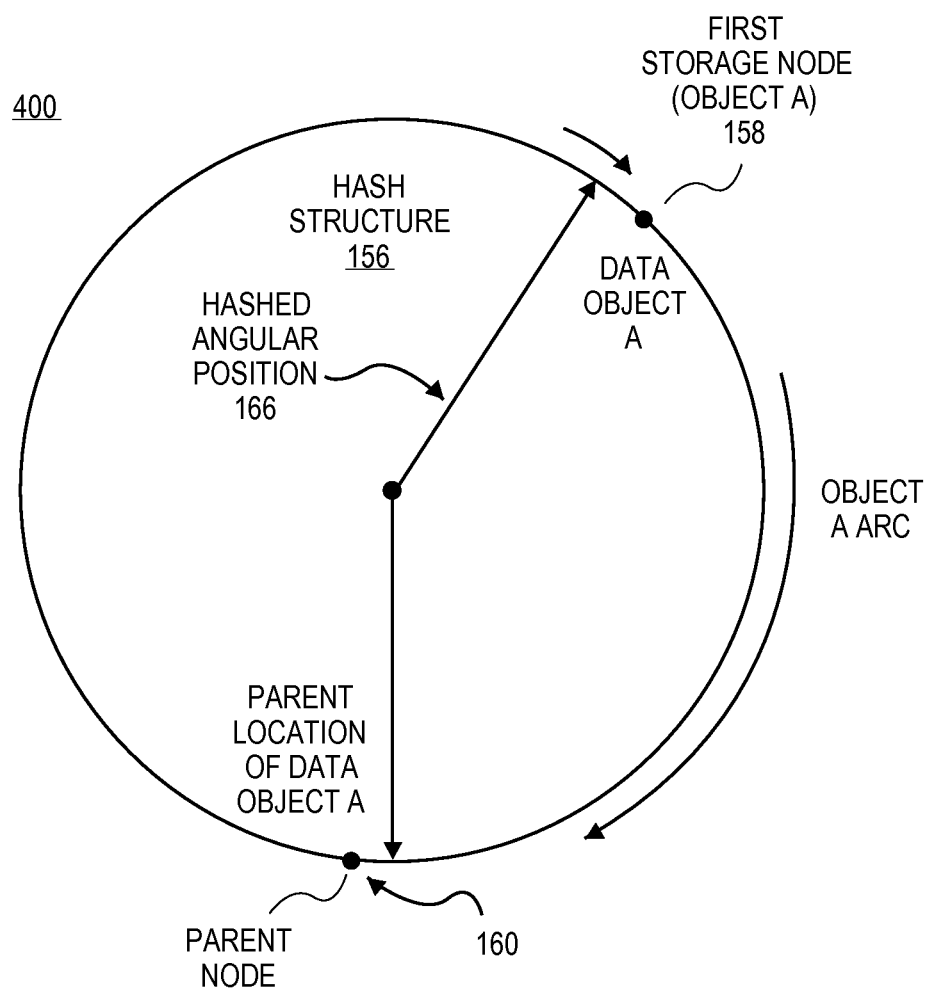

In various embodiments, and as shown for instance in FIG. 4B, the file management module 142 and/or other logic can be configured to store a data object as noted to at least two locations, and encode at least two corresponding nodes, in the hash structure. Specifically, and as shown, the file management module 142 and/or other logic can receive a request from a requesting entity 140 and/or other user, application, or service to store a data object (labeled Object A), such as a file, to the set of storage resources 152. In aspects, the file management module 142 and/or other logic can receive a name of the data object, a pathway for the data object, and/or other attribute of the object, and generate a hashed angular position 166 as an output of a consistent hash function using that attribute or attributes as an input to the hash function. The file management module 142 can/or other logic can then determine a first node 158 based on the hashed angular position 166, such as by selected the next-closest node for a storage server and/or other resource clockwise from the hashed angular position 166. The file management module 142 can store a copy of the file or other data object to the storage location encoded in or corresponding to the first node 158 (or can, in cases, store the data object in the first node 158 itself).

In addition, the file management module 142 and/or other logic can also store another copy of the data object to a location encoded by or associated with a parent node 160. Parent node 160 can represent a node whose location is hashed to an angular position generated by applying the hash function to the parent location of the data objected requested to be stored. In the case of a data filed stored in a directory structure, such as the directory structure of an operating system or a distributed directory structure such as an LDAP (lightweight directory access protocol), the parent location can be or include the pathway of a parent directory in, or under, which the data object itself is stored. Thus for instance, if the data object consists of a file named "Project_1.data" stored in a directory named "My_Projects_2010," the data object (Project_1.data) can be stored to a node whose location is defined by the hash of "My_Projects_2010." Other directory names, pathways, extensions and/or identifiers can be used, including, for example, sub-directories within a main directory, or others. It may be noted that the pair of nodes consisting of the first node 158 and the parent node 160 can create an arch, chord, and/or other section of the hash structure 156. In aspects, the requesting entity 140, file management module 142, and/or other logic can also optionally insert additional copies of the data object in locations defined by additional nodes located between the first node 158 and parent node 160, if desired. In such implementations, the parent node 160 will however remain in the set of nodes in which the storage of the data object is encoded.

Figure 4C:
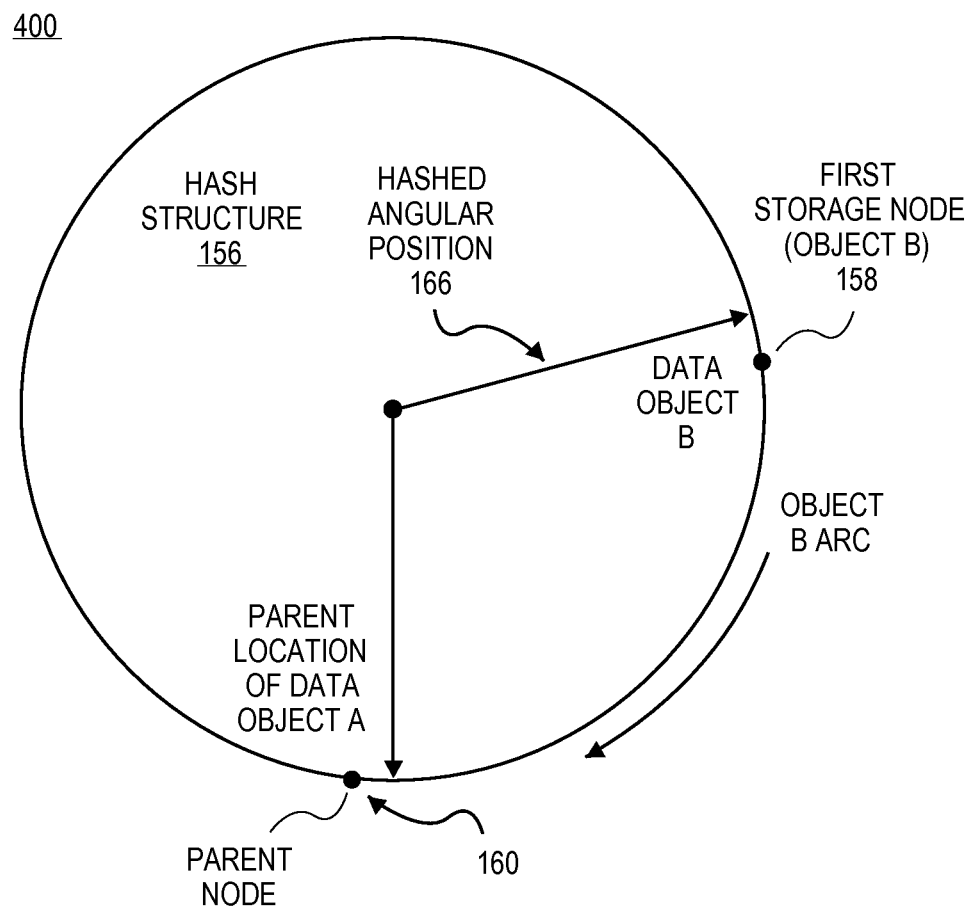

In aspects as shown, for instance, in FIG. 4C, after encoding the first data object (Object A) requested to be stored, the same or different requesting entity 140 can request the storage to the set of storage resources 152 of a second data object (labeled "Object B"). In aspects, the second data object (Object B) can be the same or different type, class, and/or format of data compared to the first object (Object A). After receiving the request, the file management module 142 and/or other logic can perform similar operations on the second data object to store that object to a first node 158, which in general will be a separate node from the first node 158 for the first data object. However, and assuming that the second data object has the same (direct or indirect) parent location, such as a parent directory, the parent node 160 generated or identified to encode the storage location for the second data object (Object B) will be the same, as for the first data object (Object A). According to aspects in various regards, therefore, the first data object (Object A) and the second data object (Object B), can be stored the same or different sets of storage locations, but with the sets always overlapping at the parent-node location 160. The process of storing data objects having a common parent directory and/or other location can be repeated for any number of additional data objects, with corresponding first nodes 158 and a common parent node 160 for all files and/or other data objects, sharing the same parent directory and/or other location.

Figure 4D:
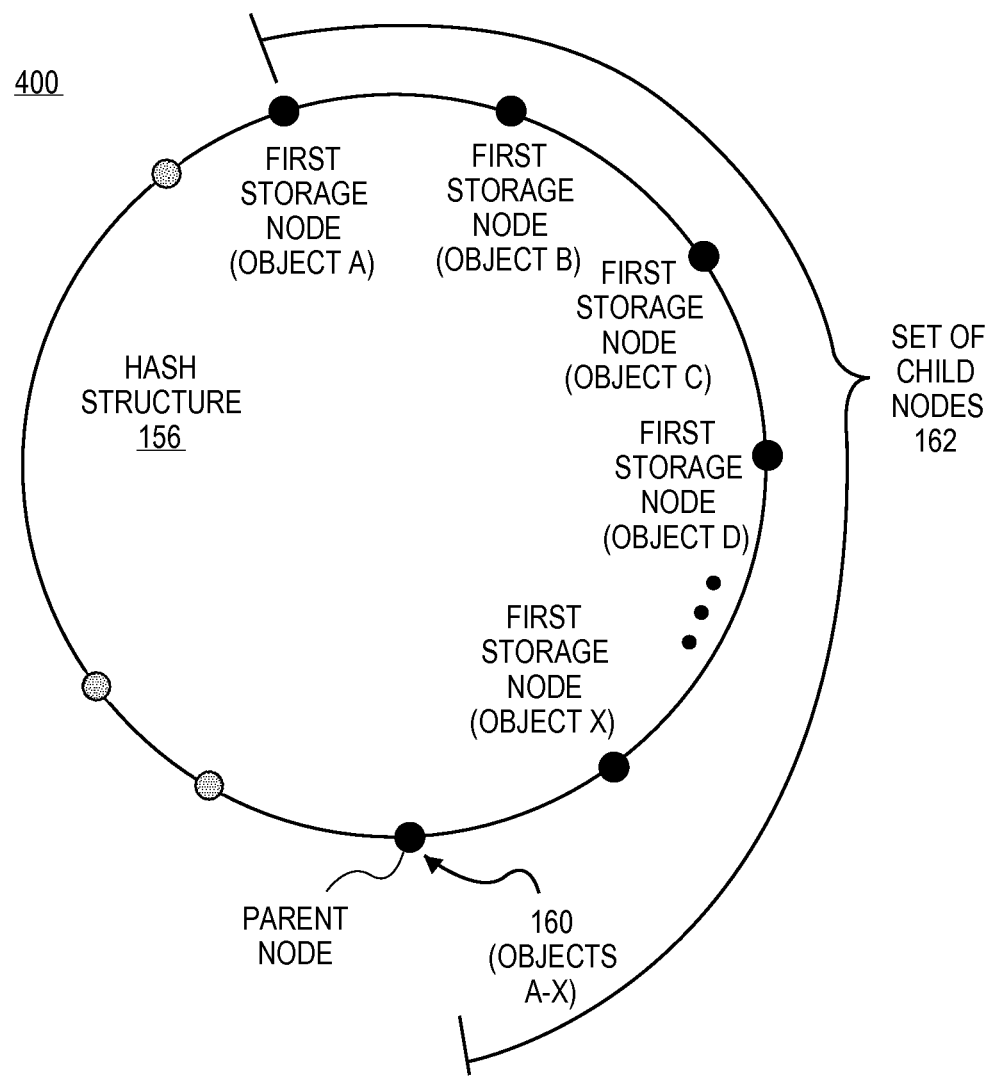

As a result, and as for example illustrated in FIG. 4D, the resulting collection of data objects sharing a common parent can form a set of child nodes 162. Each node in the set of child nodes 162 can correspond to a data object having the same parent location encoded in the parent node 160. As a result of organizing at least one copy of each of the data objects corresponding to the set of child nodes 162 in one storage location, the file management module 142 and/or other logic can perform various operations on those data objects in a compact and efficient manner. A read and/or search operation for instance can be conducted in an efficient manner by reading the values of the data objects encoded by the set of child nodes 162 in successive or otherwise rapid fashion, for instance from disk storage, memory, or other storage without a need to locate and retrieve each data object from a different hashed location (e.g. as reflected in the first node 158 for each object) potentially on a different storage server each time. Other operations on files and/or other data objects stored or hosted in a common parent location can be performed.

Figure 5:
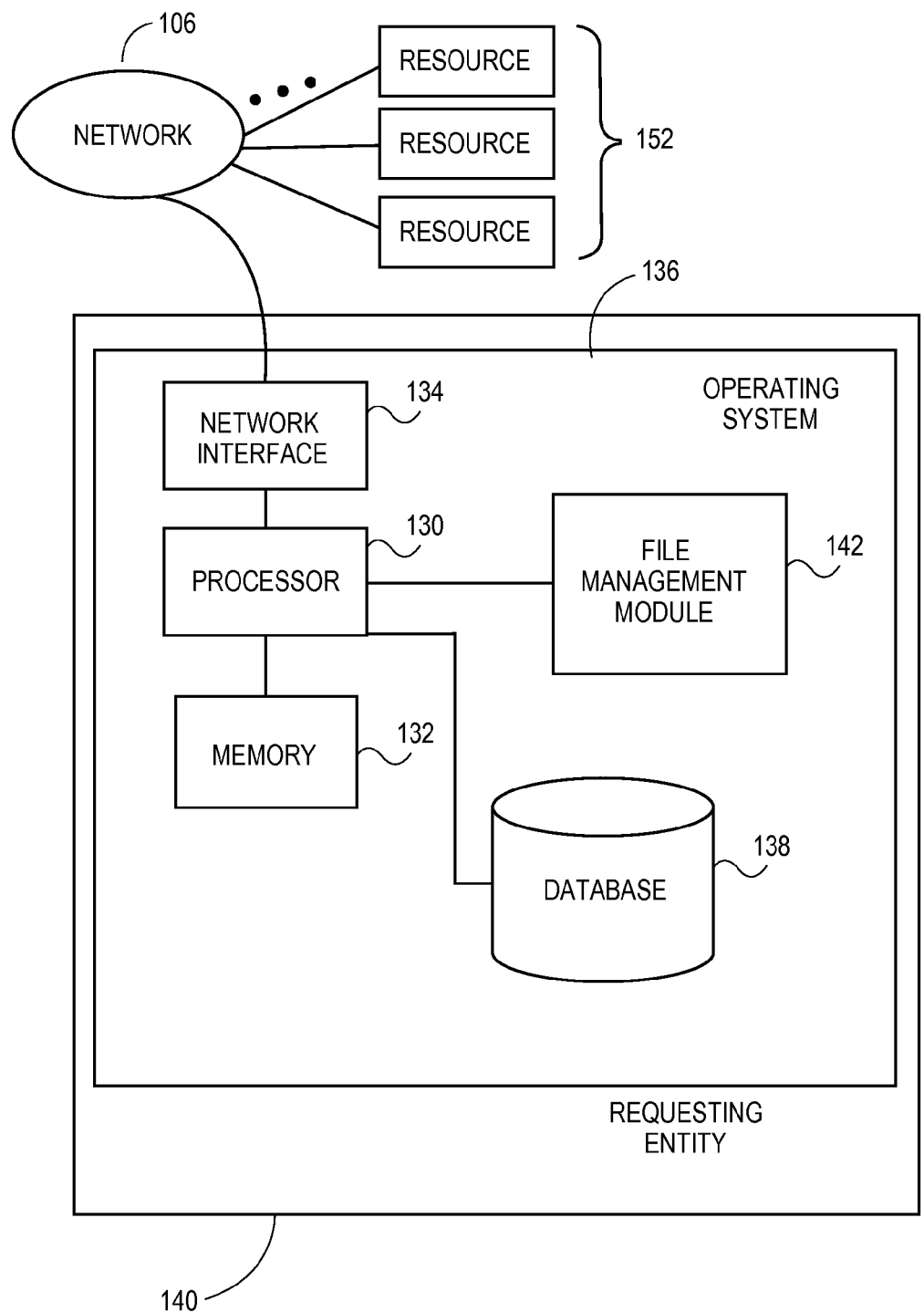
FIG. 5 illustrates an exemplary hardware configuration for a requesting entity that can comprise a client or other host system, according to various embodiments.

FIG. 5 illustrates an exemplary diagram of hardware and other resources that can be incorporated in or used by a requesting entity 140, configured to communicate with the hash structure 156, set of storage resources 152, and other storage and network resources via one or more networks 106 or other connections, according to embodiments. In embodiments as shown, the requesting entity 140 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with a computer readable storage medium such as a database 138, the file management module 142, the hash structure 156 and other resources to execute control logic, manage search and retrieval operations of files and/or other data objects stored in the set of storage resources 152, as described herein, and control the operation of other resources in cloud 102. Other configurations of requesting entity 140, associated network connections, and other hardware and software resources are possible. In embodiments, it may be noted that the cloud management system 104 and/or other platforms can comprise the same, similar, and/or different hardware, software, and other computing resources as the requesting entity 140.

Figure 6:
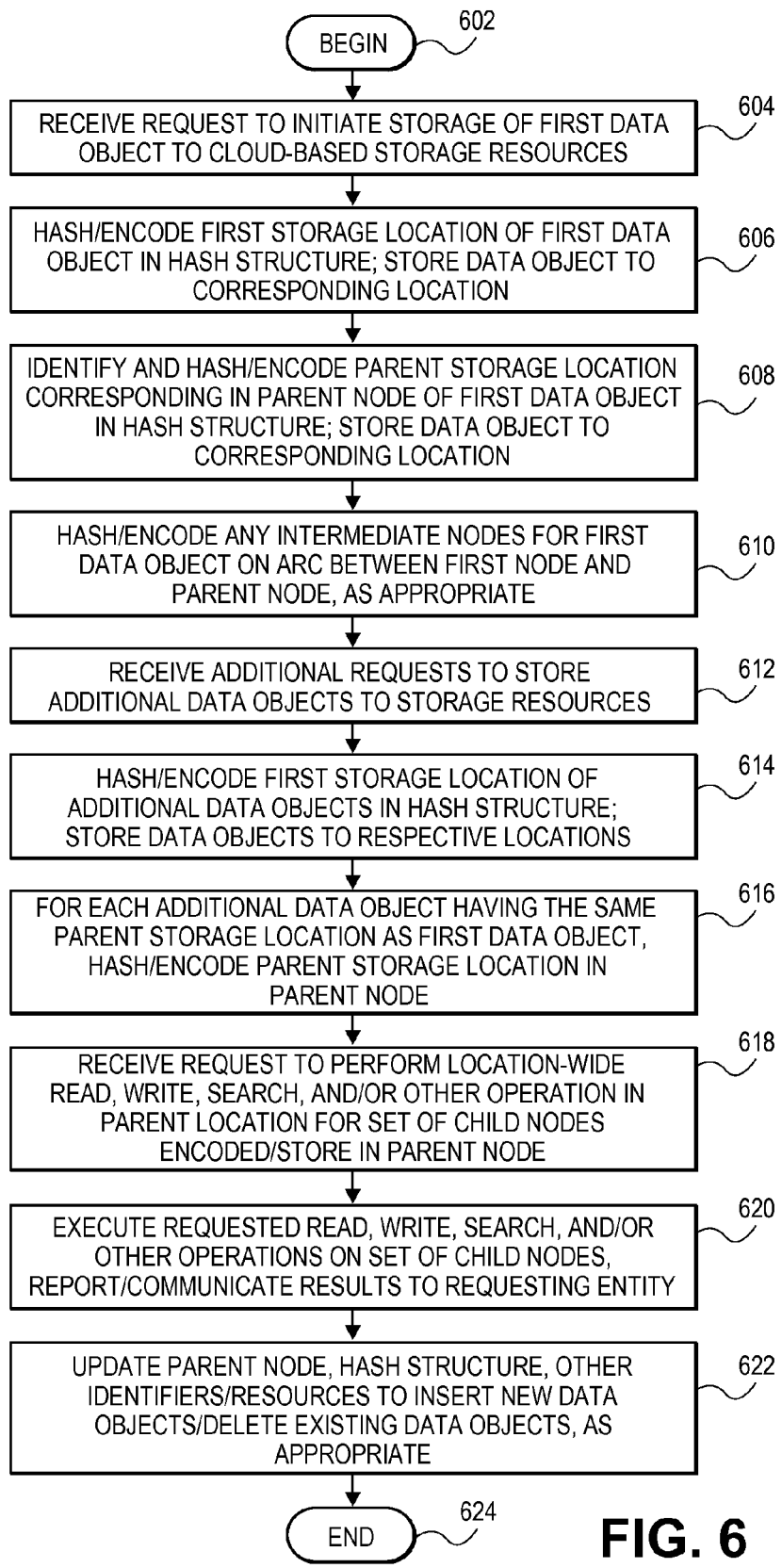
FIG. 6 illustrates a flowchart for generating hashed nodes to encode or store a data object in a first location and at least a second location in a common parent node, according to various embodiments.

FIG. 6 illustrates a flowchart for overall hash generation and file processing that can be used in systems and methods for a cloud-based directory system based on hashed values of parent and child storage locations, according to various embodiments. In 602, processing can begin. In 604, the file management module 142 and/or other logic can receive a request to initiate the storage of a first data object, such as a data file, to the set of storage resources 152 of a cloud 102, and/or other distributed storage resources. In aspects, the file management module 142 and/or other logic can receive the request from the requesting entity 140, such as the user of client machine, and/or other user or administrator. In aspects, the file management module 142 and/or other logic can receive the request from an application, service, and/or other automatic or programmed source. In 606, the file management module 142 can hash and/or encode the first node 158 for the data object requested to be stored on or associated with hash structure 156, and store the data object to that node or linked location. In embodiments, the first node 158 can be encoded or identified by calculating the next-closest node to an angular value determined by the name of the data object or a selected path to a storage location for the data object.

In 608, the file management module 142 and/or other logic can hash and/or encode the parent node 160 for the data objected to be stored on or in association with hash structure 156, and store a copy of the data object to that node or linked location. In embodiments, the parent node 160 can be encoded or identified by calculating the next-closest node to an angular value determined by the name of the parent location of the data object or a selected path to a storage location for the parent location. In 610, the file management module 142 can receive a request for, or can initiate automatically, the storage of one or more copies of the data object to one or more additional nodes located between the first node 158 and parent node 160, as appropriate. In aspects, it may be optionally requested by the requesting entity 140, or by programmed logic such as applications or services, to insert or encode additional copies of the data object in additional nodes located in the arc or chord between the first node 158 and parent node 160, for instance for data backup and/or other purposes. In aspects, it may not be requested or may not be necessary to insert or encode additional copies of the data object in such additional nodes.

In 614, the file management module 142 and/or other logic can receive additional requests to store additional data objects to locations encoded by the hash structure 156, including one or more data objects which may have or which may share the same parent node 160 as other data objects encoded in hash structure 156. In 614, the file management module 142 and/or other logic for the same or another requesting entity 140 can hash and/or encode the first storage location of those additional data objects to a corresponding separate first node 158 in hash structure 156, for each of those objects. In 616, the file management module 142 and/or other logic for the same or another requesting entity 140 can, for each additional data object having the same parent location as the first data object, hash and/or encode the parent storage location in the parent node 160. It may be noted that according to aspects, all files and/or other data objects that share the same parent directory and/or other parent location may therefore be stored and/or linked at or to one location via parent node 160, and form a set of child nodes 162 associated with the parent node 160. Those data objects may in addition each have a corresponding first node 158, and/or optional intermediate or additional nodes, encoded in hash structure 156 that is unique to or separate for each individual data object.

In 618, the file management module 142 of any requesting entity 140 can receive a request to perform a location-wide read, write, search, and/or other operations in the parent location for the set of child nodes 162 encoded in the parent node 160. It may be noted that in embodiments, the file management module 142 and/or other logic can maintain a flag and/or other indicator or attribute for data objects that indicates that the object has a parent node and/or the identity of the parent location encoded by the node.

In 620, when the file management module 142 and/or other logic that receives the request to perform a read, write, search, and/or other operation, the file management module 142 and/or other logic can execute the requested operation on the set of child nodes 162 which are encoded, stored, and/or otherwise associated with the parent node 160. In aspects, when a request to perform a read, write, search, and/or other operation is received by the file management module 142 and/or other logic that is indicated to request a search on a directory-wide and/or other location or level-wide basis, the file management module 142 can be configured to automatically execute that search or other activity based on the parent node 160, to thereby achieve visibility of the entire set of child nodes 162 from within the same directory or other location. This may include, for instance, performing the read, write, search, and/or other operations from within one storage sever, database and/or other storage resource in the set of storage resources 152, resulting in more compact and efficient file operations or operations on other data objects. In 622, the file management module 142 and/or other logic can update the parent node 160, the hash structure 156, and/or other resources associated with the hashed storage architecture described in embodiments herein to insert one or more new data objects, update or modify existing data objects, move or delete existing data objects, and/or perform other activity on the data encoded by the hash structure 156 and its associated set of storage resources 152, as appropriate. In 624, processing can repeat, return to a prior processing point, jump to a further processing point, or end.

The foregoing description is illustrative, and variations in configuration and implementation may occur to persons skilled in the art. For example, while embodiments have been described which operate using one file management module 142 and associated cloud management system 104, in embodiments, one or more of file management module 142 and associated cloud management system 104, and/or other servers, data stores, and/or other logic or resources can be used. For further example, while embodiments have been described in which cloud resources and subscription plans are modified or adjusted, in embodiment, the subscription plans, associated fees, and resources associated with the plans can be modified or adjusted according to any combination and at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving, by a processor, a request to store a data object in a hash structure comprising a consistent hash ring, wherein the data object is associated with a parent directory;
identifying, by the processor, a first node in the hash structure corresponding to a next-closest node to an angular position of the consistent hash ring identified in view of applying a hash function to an attribute of the data object, the first node corresponding to a first storage location;
identifying, by the processor, a terminal node in the hash structure corresponding to an output of the hash function performed on an attribute of the parent directory of the data object, the terminal node corresponding to a second storage location; and
storing, by the processor, the data object to the first storage location corresponding to the first node and the second storage location corresponding to the terminal node.

2. The method of claim 1, wherein the terminal node comprises a next-closest node to an angular position of the consistent hash ring identified in view of applying the hash function to the attribute of the parent directory.

3. The method of claim 1, wherein the data object comprises a data file.

4. The method of claim 1, wherein the attribute of the data object comprises a name of a pathway to the data object.

5. The method of claim 1, wherein the attribute of the parent directory comprises a name of a pathway to the parent directory.

6. The method of claim 1, further comprising storing the data object to a location corresponding to an additional node located between the first node and the terminal node in the hash structure.

7. The method of claim 1, wherein the data object comprises a set of multiple data objects each having a same parent directory, the method further comprising storing the set of multiple data objects to the second storage location corresponding to the terminal node of the hash structure.

8. The method of claim 7, further comprising performing at least one of a read operation, a write operation, or a search operation on the set of multiple data objects stored in the parent directory.

9. A system comprising:
a memory comprising instructions; and
a processor operatively coupled to the memory, the processor to execute the instructions to:
receive a request to store a data object in a hash structure comprising a consistent hash ring, wherein the data object is associated with a parent directory,
identify a first node in the hash structure corresponding to a next-closest node to an angular position of the consistent hash ring identified in view of applying a hash function to an attribute of the data object, the first node corresponding to a first storage location,
identify a terminal node in the hash structure corresponding to an output of the hash function performed on an attribute of a parent directory of the data object, the terminal node corresponding to a second storage location, and
store the data object to the first storage location corresponding to the first node and the second storage location corresponding to the terminal node.

10. The system of claim 9, wherein the terminal node comprises a next-closest node to an angular position of the consistent hash ring identified in view of applying the hash function to the attribute of the parent directory.

11. The system of claim 9, wherein the data object comprises a data file.

12. The system of claim 9, wherein the data object comprises a set of multiple data objects each having a same parent directory, the processor to store the set of multiple data objects to the second storage location corresponding to the terminal node of the hash structure.

13. The system of claim 12, the processor to perform at least one of a read operation, a write operation, or a search operation on the set of multiple data objects stored in the parent directory.

14. A non-transitory computer readable storage medium comprising instructions to cause a processor to perform operations comprising:
receive, by the processor, a request to store a data object in a hash structure comprising a consistent hash ring, wherein the data object is associated with a parent directory;
identify, by the processor, a first node in the hash structure corresponding to a next-closest node to an angular position of the consistent hash ring identified in view of applying a hash function to an attribute of the data object, the first node corresponding to a first storage location;
identify, by the processor, a terminal node in the hash structure corresponding to an output of the hash function performed on an attribute of the parent directory of the data object, the terminal node corresponding to a second storage location; and
store, by the processor, the data object to the first storage location corresponding to the first node and the second storage location corresponding to the terminal node.

15. The non-transitory computer readable storage medium of claim 14, wherein the attribute of the parent directory comprises a name of a pathway to the parent directory.

16. The non-transitory computer readable storage medium of claim 14, wherein the terminal node comprises a next-closest node to an angular position of the consistent hash ring identified in view of applying the hash function to the attribute of the parent directory.

* * * * *